US012405147B2

(12) United States Patent
Gebert et al.

(10) Patent No.: US 12,405,147 B2
(45) Date of Patent: Sep. 2, 2025

(54) RETAINING DEVICE FOR AN ANEMOMETER, AND CENTRIFUGAL FAN

(71) Applicant: ebm-papst Mulfingen GmbH & Co. KG, Mulfingen (DE)

(72) Inventors: Daniel Gebert, Öhringen (DE); Thomas Heli, Langenburg (DE); Peter Riegler, Boxberg (DE); Valerius Schaaf, Kupferzell (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 436 days.

(21) Appl. No.: 16/965,060

(22) PCT Filed: Mar. 6, 2019

(86) PCT No.: PCT/EP2019/055615
§ 371 (c)(1),
(2) Date: Jul. 27, 2020

(87) PCT Pub. No.: WO2019/211027
PCT Pub. Date: Nov. 7, 2019

(65) Prior Publication Data
US 2021/0108954 A1    Apr. 15, 2021

(30) Foreign Application Priority Data
May 3, 2018    (DE) .......................... 102018110618.1

(51) Int. Cl.
*G01F 15/18*    (2006.01)
*F04D 27/00*    (2006.01)
(Continued)

(52) U.S. Cl.
CPC ........... *G01F 15/18* (2013.01); *F04D 27/001* (2013.01); *F04D 29/4226* (2013.01); *G01F 1/12* (2013.01)

(58) Field of Classification Search
CPC .... F04D 27/001; F04D 29/441; F04D 29/444; F04D 29/4226
See application file for complete search history.

(56) References Cited

U.S. PATENT DOCUMENTS 3,244,002 A    4/1966  Prono et al.
3,922,525 A *  11/1975 Kozak ..................... G01F 1/103
                                                    250/233
(Continued)

FOREIGN PATENT DOCUMENTS

CN    206246382 U *  6/2017   ......... F04D 29/4226
DE    19705660 A1 *  8/1998   ............... G01F 1/10
(Continued)

OTHER PUBLICATIONS

International Search Report and Written Opinion dated Jun. 4, 2019.

*Primary Examiner* — Courtney D Heinle
*Assistant Examiner* — Cameron A Corday
(74) *Attorney, Agent, or Firm* — Dickinson Wright PLLC (57) ABSTRACT

The disclosure relates to a retaining device for an anemometer, designed for use on a fan housing of a fan, wherein the retaining device is designed as a flow conditioner having a plurality of axial flow channels divided into a honeycomb structure by an arrangement of bars, and wherein the retaining device has retaining means, by means of which the anemometer can be fastened to the retaining device such that the former axially adjoins the flow channels.

19 Claims, 6 Drawing Sheets

(51) Int. Cl.
*F04D 29/42* (2006.01)
*G01F 1/12* (2006.01)

(56) References Cited

U.S. PATENT DOCUMENTS

| | | | |
|---|---|---|---|
| 4,089,215 A | 5/1978 | Chapin | |
| 4,715,234 A | 12/1987 | Allen et al. | |
| 5,927,400 A * | 7/1999 | Bononi | G05D 7/0635 |
| | | | 137/499 |
| 6,138,519 A * | 10/2000 | Bergervoet | G01F 1/12 |
| | | | 73/861.79 |
| 6,398,492 B1 * | 6/2002 | Cho | F04D 29/544 |
| | | | 416/189 |
| 2006/0147304 A1 * | 7/2006 | Cho | F04D 29/544 |
| | | | 415/191 |
| 2008/0190214 A1 * | 8/2008 | Ubowski | G01F 1/10 |
| | | | 29/889.22 |
| 2009/0320608 A1 * | 12/2009 | Marcu | G01F 1/10 |
| | | | 73/861.79 |
| 2015/0330411 A1 * | 11/2015 | Heli | F04D 29/667 |
| | | | 415/208.2 |
| 2018/0156240 A1 * | 6/2018 | Müller | F04D 29/544 |

FOREIGN PATENT DOCUMENTS

| | | | | |
|---|---|---|---|---|
| DE | 1022016115615 A1 | 3/2018 | | |
| EP | 1460392 B1 * | 11/2006 | | G01F 1/10 |
| SE | 515102 C2 * | 6/2001 | | F24F 11/04 |

* cited by examiner

RETAINING DEVICE FOR AN ANEMOMETER, AND CENTRIFUGAL FAN

RELATED APPLICATIONS

This application claims priority to and is a 35 U.S.C. § 371 national phase application of PCT/EP2019/055615, filed Mar. 6, 2019 and claims priority to German Patent Application No. 10 2018 110 618.1, filed May 3, 2018, the entire contents of which are incorporated herein by reference in their entirety.

FIELD

The disclosure relates to a retaining device for an anemometer in particular for use in a centrifugal fan, as well as to the centrifugal fan with a corresponding retaining device with anemometer.

BACKGROUND

The use of an anemometer in fans is known in principle; for example, DE 10 2016 115 615 A1 discloses a centrifugal fan with an impeller anemometer at the outlet area, wherein the rotational speed of the impeller anemometer is detected and processed as a signal by a control unit to derive the conveyed air flow volume. The application in the present disclosure is preferably identical to that one. The measurement and the measured value of the conveyed air flow volume are relevant for the control of the fan. Therefore, the measurement accuracy should be as high as possible. At the same time, the complexity regarding component count and measurement process should remain limited for economic reasons.

In the prior art, the anemometer is attached to the fan housing via a ring, wherein, however, parts of the ring are located in the flow, thus affecting said flow before the anemometer is attached.

BRIEF SUMMARY

The present disclosure therefore provides a retaining device for an anemometer for use in a fan, which increases the measurement accuracy of the air volumetric flow rate generated by the fan and measured by the anemometer, without negatively affecting the flow.

This problem in the prior art is solved by the combination of characteristics according to Claim 1.

According to the disclosure, a retaining device for an anemometer is proposed for use on a fan housing of a fan. The retaining device is designed as a flow conditioner with multiple axial flow channels divided into a honeycomb structure by an arrangement of bars, and has retaining means, by means of which the anemometer is axially attachable to the flow channels adjoining the retaining device.

The retaining device for the anemometer, which retaining device is designed as a flow conditioner, makes it possible, in particular, to condition a swirling flow generated by the fan and thus to improve the accuracy of measuring the air volumetric flow rate through the anemometer. Noise is also reduced. In addition, the retaining device simultaneously serves as a bracket for the anemometer, such that the retaining device and the anemometer can be installed together in the fan as a unit. Separate support elements, which are used to fasten the anemometer to the fan, are no longer required.

As a retaining means for the fastening arrangement of the anemometer, the retaining device has a central hub on which the anemometer is received in a supporting manner. The anemometer preferably is designed as an impeller anemometer and rotates relative to the retaining device when an air flow from the fan passes through it. The actual air volumetric flow rate can be derived from the rotational speed. The retaining device defines a circular disc, which preferably covers the entire impeller anemometer in the axial view.

To mount the retaining device to the fan housing of the fan, in particular in the outlet area, the retaining device also preferably has fastening means, for example in the form of protrusions, which engage with corresponding slots in the fan housing.

The retaining device designed as a flow conditioner generates its flow-conditioning effect via the axial flow channels divided into a honeycomb structure by the arrangement of bars. In one embodiment, it is provided that the arrangement of bars is formed by radial struts and circumferential struts. The radial struts preferably extend radially outward from the axial center, i.e., the center axis of the retaining device; the circumferential struts preferably extend in circular shapes in the circumferential direction. The intersection points of the radial struts and the circumferential struts create the individual flow channels, which are separated from each other and are adjacent in the radial and circumferential direction, and which combine to form the honeycomb structure as seen in an axial front view.

In this case, a design is favorable, in which a first number of radial struts extend from a central axis of the retaining device across multiple circumferential struts and another number of radial struts extend only between radially adjacent circumferential struts. Preferably, some radial struts extend across the entire radial extension of the retaining device, i.e., continuously from its center axis to its outer diameter. Additional radial struts are provided between respective pairs of circumferential struts adjacent to each other in the radial direction, which segment the retaining device further.

In one embodiment of the retaining device, which is advantageous regarding the flow, the radial struts extend in a curved shape in a circumferential direction. Preferably, the curvature of all radial struts is identical or essentially identical therein.

In the retaining device, it is advantageous if the number n of the circumferential struts is determined in dependence on their outer dimensions via the formula $n=Da/X$, where X is in a range of 20 to 80, in particular 35 to 60, and Da corresponds to the value in millimeters of the flow diameter of the retaining device. Herein, the number n is rounded to an integer. The flow diameter is determined by the section of the retaining device through which a flow is possible.

In one embodiment of the retaining device favorable with regard to flow, it is provided that its axial longitudinal extension is constant in the range of the flow channels.

The flow channels in the radial outer area influence the flow more than do those in the central area around the center axis of the retaining device. In one further development, it is therefore provided that the central flow channels adjacent to the center axis of the retaining device have a greater maximum flow cross-sectional area than the flow channels located further outside in the radial direction.

Furthermore, an embodiment of the retaining device is characterized in that the circumferential struts form closed rings and divide the retaining device into multiple radially adjacent ring segments. The number of ring segments is determined by the number of circumferential struts, which in turn can be determined by the formula n=Da/X shown above. Insofar as the retaining device is designed in a circular shape, it is preferably enclosed by a support ring forming the outer radius of the retaining device. The retaining device can also be fixed within the outlet area of the fan by means of the support ring.

In the area of the flow channels through which air can flow, it is provided in a further embodiment that the mean axial longitudinal extension of the retaining device is greater than an average circumferential length of the flow channels in the radially outermost ring segment.

The mean axial length t1 of the radially outermost ring segment preferably is defined in dependence on the cross-sectional area A1 of the flow channels through which air can flow in the radially outermost ring segment, by use of the formula t1=A11/2·Z, wherein Z is in a range of 0.8 to 2, in particular 1.1 to 1.4.

Furthermore, it is advantageously provided in the retaining device that the number of radial struts in the radially outer ring segments is an integral multiple higher than in the radially innermost ring segment, which adjoins the central axis of the retaining device. For example, 7 radial struts, evenly distributed in the circumferential direction, can extend in the first ring segment located on the center axis, 14 radial struts in the second ring segment adjoining the first in a radially outward direction, and 28 radial struts in the third ring segment adjoining the second in a radially outward direction, thus forming the individual flow channels together with the circumferential struts.

In one embodiment, the retaining device is characterized in that a ring segment cross-sectional area (Am) of the ring segment on the inner center axis increases toward the ring segment cross-sectional surface (Am−1) of the respective ring segment adjoining it radially outward, wherein Am=Y·Am−1, with 1.1≤Y≤2.5, in particular 1.2≤Y≤2.0. Therein, the ring segment cross-sectional area is determined by the entire area between two adjacent circumferential struts or by the cross-sectional area enclosed within the first circumferential strut closest to the central axis, without taking the radial struts into account. The radial struts divide the ring segments, wherein the cross-sectional area of each individual flow channel, through which air can flow, preferably decreases toward each radially outward ring segment, as the number of radial struts increases. This means that despite the increase in the ring segment cross-sectional area in a radially outward direction, the cross-sectional area of each individual flow channel is reduced due to the increased number of radial struts compared to the flow channels in ring segments located further inward in a radial direction.

The disclosure also comprises a formation of the retaining device described above with an attached impeller anemometer as a unit for use in a fan, in particular a centrifugal fan. For this purpose, the impeller anemometer is attached to the retaining device, such that both parts are mountable, deliverable or retrofittable as a unit.

In addition, the disclosure comprises a centrifugal fan with a fan housing having an outlet area, to which housing the retaining device described above is fixed. Therein, the anemometer is arranged such that it directly adjoins the retaining device in the axial flow direction, and is attached to the retaining device via the retaining means. The centrifugal fan, moreover, is designed in the manner known in the art, with an impeller, an axial intake opening and an outlet opening oriented in the circumferential direction. The fan housing preferably is designed in a spiral shape. The centrifugal fan generates the air flow by means of the impeller, which air flow is conveyed through the retaining device designed as a flow conditioner and is arranged at the outlet area.

The retaining device designed as a flow conditioner is arranged upstream of the anemometer in the centrifugal fan, as seen in the axial flow direction, such that the air flow first passes through the flow conditioner and then through the anemometer.

One advantageous embodiment provides that the anemometer is designed as an impeller anemometer in the centrifugal fan, with multiple impeller blades arranged such that they are spaced apart in the circumferential direction, and that the impeller blades are curved in an arc shape in a circumferential direction opposite to the radial struts of the retaining device.

BRIEF DESCRIPTION OF THE DRAWINGS

Other advantageous further developed embodiments of the disclosure are characterized in the dependent claims and/or are described in more detail through the drawings in conjunction with the description of the preferred embodiment of the disclosure. The drawings show:

DETAILED DESCRIPTION

FIGS. 1 to 5 show a first embodiment of a retaining device 1 designed as a flow conditioner, which retaining device 1 is partially shown together with an attached impeller anemometer 30 as a unit 90; see FIGS. 1 to 4. The retaining device 1, or the unit 90 of the retaining device 1 and the impeller anemometer 30, is arranged on an outlet area 60 of a centrifugal fan 100, an example of which is shown in FIG. 6. Alternatively, the retaining device 1, or the unit 90 of the retaining device 1 and the impeller anemometer 30, is inserted into the outlet area 60 and fixed to the inner wall of the fan housing 50.

Figure 1:
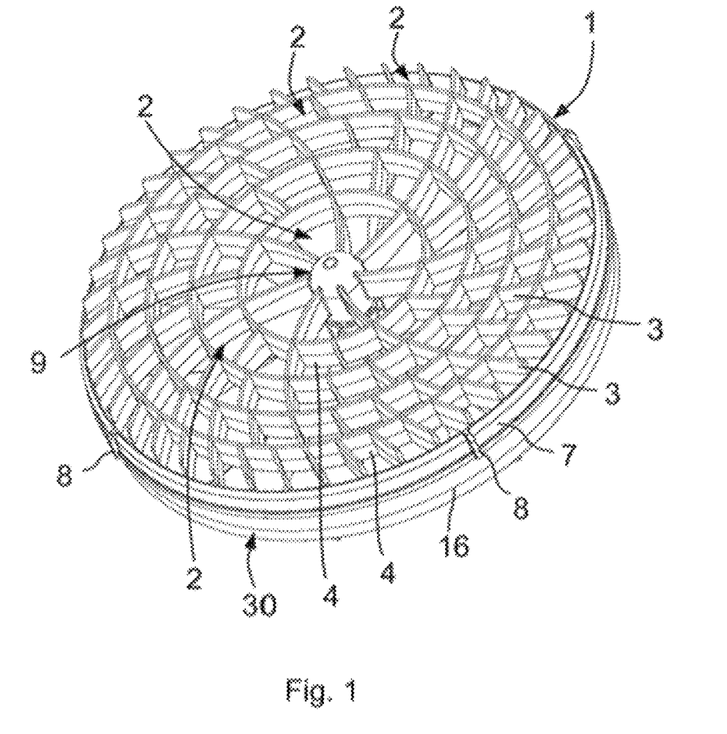
FIG. 1 A perspective view of a retaining device with an anemometer connected to the rear.
Figure 2:
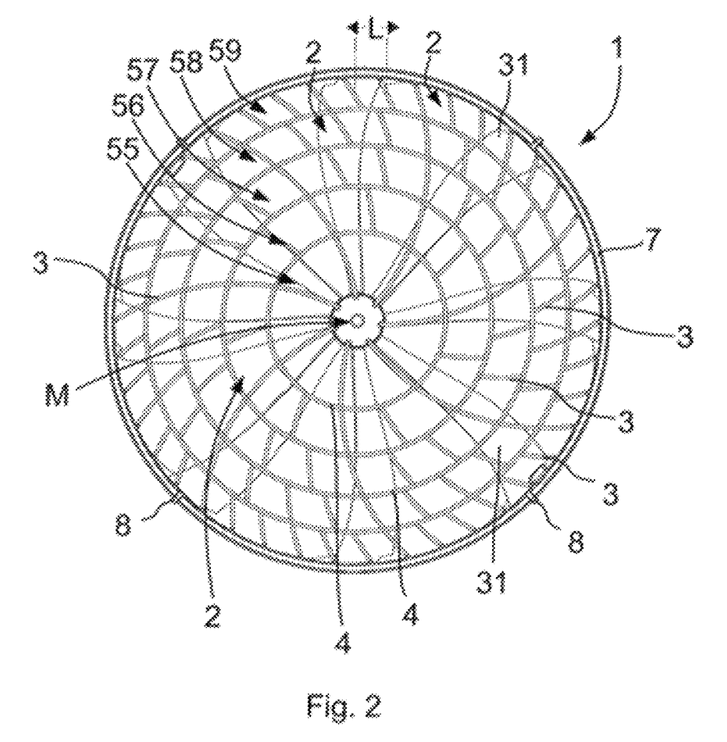
FIG. 2 An axial front view of the retaining device from FIG. 1.
Figure 3:
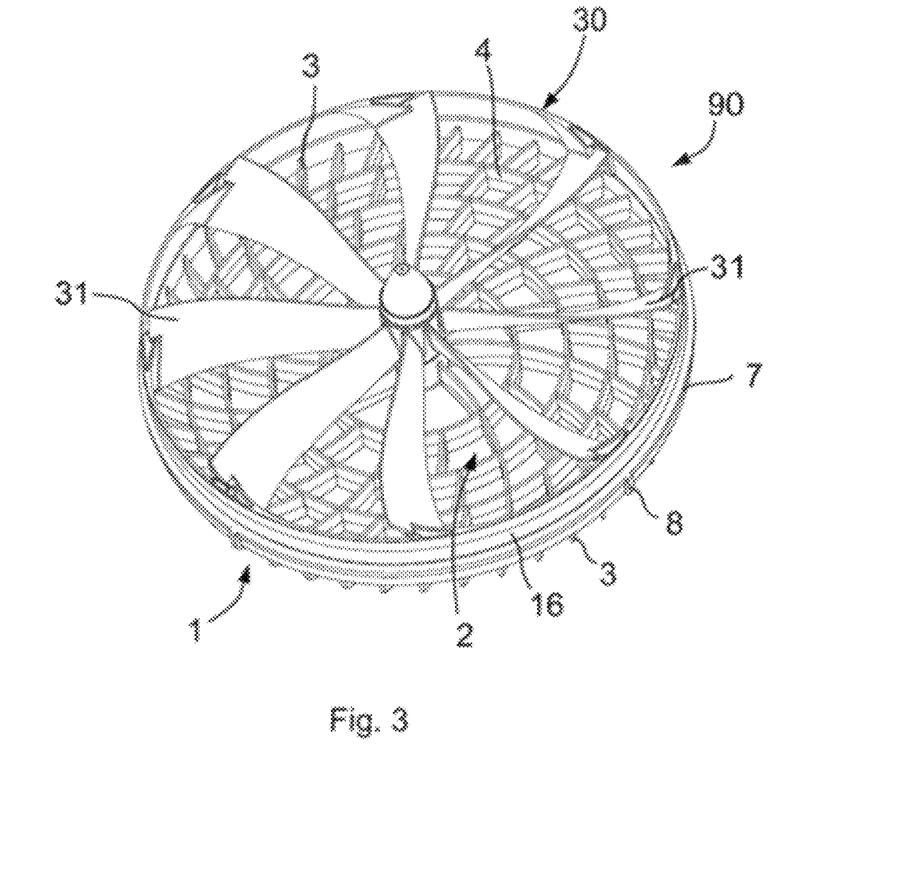
FIG. 3 A perspective rear view of the outlet side of the retaining device from FIG. 1 combined with a downstream anemometer as a unit.
Figure 4:
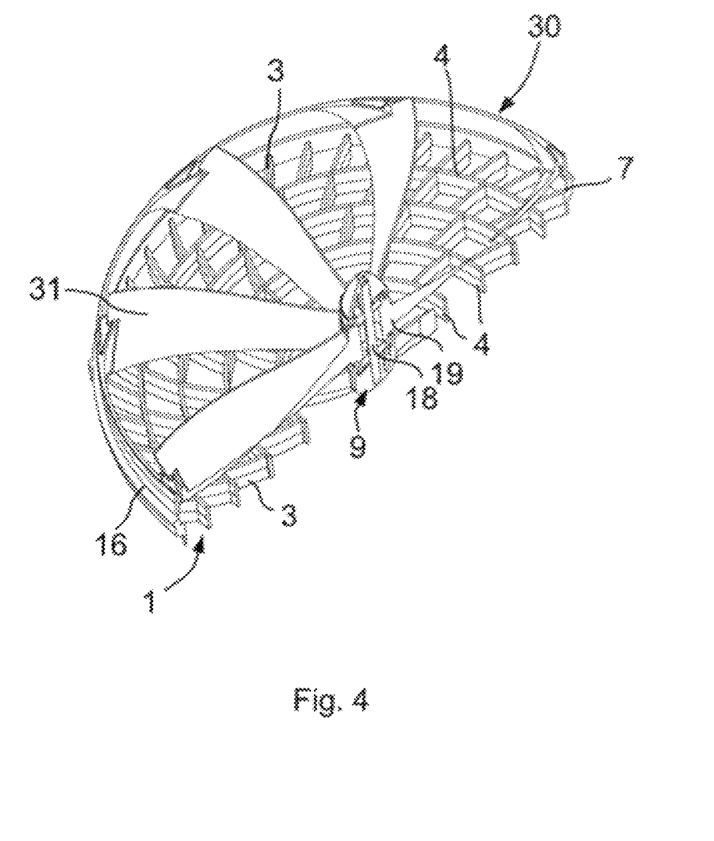
FIG. 4 A partial sectional view of the retaining device and the anemometer from FIG. 3.

In FIGS. 1 and 2, the retaining device 1 is shown in a round embodiment, as seen from its intake side. Between the circumferential support ring 7 and the axially central mount 9 comprising the center axis M, the arrangement of bars is formed by four circumferential struts 4 forming closed rings and seven continuous radial struts 3, as well as a plurality of radial struts 3 extending across partial radial sections, by means of which arrangement of bars the retaining device 1 forms flow channels 2 adjoining each other in the radial and circumferential direction in the manner of a honeycomb. The circumferential struts 4 divide the retaining device 1 into multiple radially adjoining ring segments 55, 56, 57, 58, 59, the respective ring segment cross-sectional area of which increases in the radially outward direction. At the same time, the number of radial struts 3 increases from ring segment to ring segment in the radially outward direction by an integral multiple, i.e., there are seven radial struts 3 in the first ring segment, fourteen radial struts 3 in the second ring segment, twenty-one radial struts 3 in the third ring segment 57, up to the fifth ring segment 59, in which forty-two radial struts 3 are arranged. The increase in the number of radial struts 3 reduces the flow surface of the flow channels 2, such that the respective flow surface of the flow channels 2 decreases from ring segment to ring segment in the radially outward direction. In the embodiment shown here, the radially non-continuous radial struts 3 always extend exclusively between two adjacent circumferential struts 4. All radial struts 3 are curved in the shape of an arc, counterclockwise as seen from the outlet side according to FIG. 1.

Multiple protrusions 8 are formed at the outer circumferential edge of the support ring 7, by means of which protrusions 8 the support ring 7 and thus the retaining device 1 can be attached to the inner wall of the fan housing 50, including, for example, the housing shown in FIG. 6.

Figure 5:
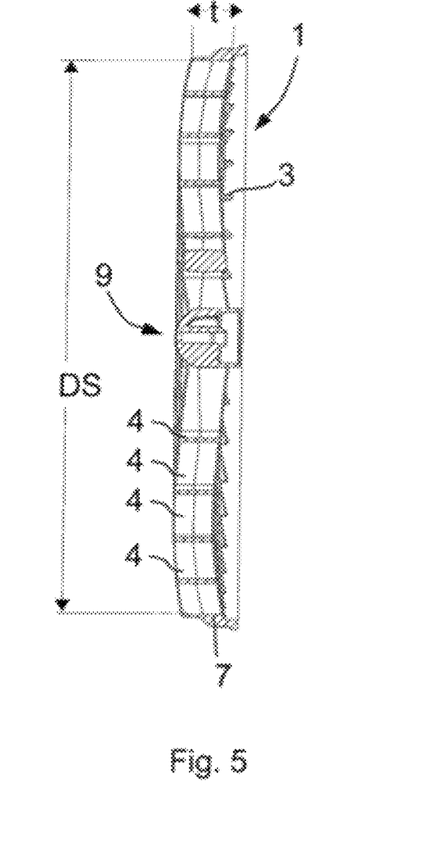
FIG. 5 A sectional side view of the retaining device from FIG. 1.
Figure 6:
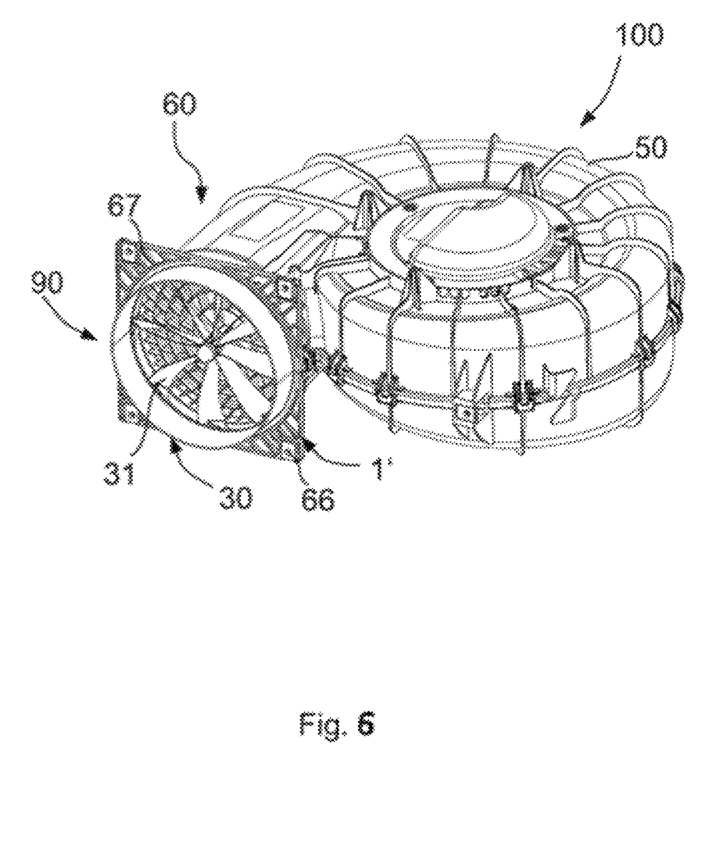
FIG. 6 An alternative embodiment of the retaining device from FIG. 1 connected to a centrifugal fan; and Identical reference numbers refer to identical components in all views.

Referring to FIG. 5, the retaining device 1 is shown in a sectional side view to show that, according to this embodiment, the mean axial longitudinal extension t of the retaining device t in the area of the flow channels 2 is constant over the radial extension of the retaining device 1. Both the radial struts 3 and the circumferential struts 4 respectively extend bar-like across the entire axial longitudinal extension t. In addition, the flow diameter DS of the retaining device 1 is marked. Referring to FIG. 2, it is clear that the mean axial longitudinal extension t of the retaining device 1 is greater in the area of the flow channels 2 than the mean circumferential length L of the flow channels 2 in the radially outermost ring segment 59, such that t>L.

As the impeller anemometer 30 is always fixed at the retaining device 1 according to FIGS. 1-4, the retaining device 1 and the impeller anemometer 30 can be considered as a unit 90, which can be used, for example, in the centrifugal fan according to FIG. 6. The impeller anemometer 30 has multiple impeller blades 31 spaced apart in the circumferential direction, which blades are curved in the circumferential direction, wherein the curvature direction of the radial struts 3 is opposite, as can be clearly seen in FIGS. 2 and 3, for example. Furthermore, the impeller anemometer 30 comprises a circumferential ring 16, which essentially corresponds to the support ring 7 with respect to its outer radius, and which is attached to the same or is attached to the same on the radially inward or outward side. The impeller blades 31 meet in the center at a hub 19 and are arranged such that they are supported on the mount 9 of the retaining device 1 by means of an axle 18, such that the impeller blades 31 can rotate relative to the retaining device 1 and to the circumferential ring 16.

FIG. 6 shows a centrifugal fan 100 with a spiral-shaped fan housing 50, which comprises the outlet area 60. An alternative, square version of the retaining device 1' with an attached impeller anemometer 30, which again can be mounted together as a unit 90, is fixed on the outside of the outlet area 60. All the characteristics discussed above also apply to the embodiment of the retaining device 1', which only protrudes beyond the circumferential ring 16 of the impeller anemometer 30 and which defines four fastening points 66 on the outer edge sections defining its square shape, by means of which fastening points 66 the centrifugal fan 100 is mounted at its place of operation. Multiple parallel struts 67 extend in a straight line radially outward in the outer edge sections.

The invention claimed is:

1. An anemometer designed for use on a fan housing of a fan, the anemometer receiving air from an upstream direction, the anemometer comprising:
    an impeller;
    a retaining device for mounting the anemometer to the fan housing, wherein the retaining device is designed as a flow conditioner to straighten swirling flow of the air, the retaining device located upstream of the impeller and having a plurality of axial flow channels divided into a honeycomb structure by an arrangement of bars formed by radial struts and circumferential struts, wherein each of the radial struts extend curved in the shape of an arc in the same circumferential direction; and
    wherein the retaining device has retaining means, by means of which the anemometer can be fastened to the retaining device such that it is axially adjoining the flow channels.

2. The retaining device according to claim 1, wherein the retaining device has fastening means for fastening the retaining device in an outlet area of the fan housing of the fan.

3. The retaining device according to claim 1, wherein a first number of radial struts extend from a center axis (M) of the retaining device across multiple circumferential struts, and a second number of radial struts exclusively extend between radially adjacent circumferential struts.

4. The retaining device according to claim 1, wherein each of the radial struts are curved in a direction that is opposite a direction of curvature of blades of the impeller.

5. The retaining device according to claim 1, wherein a number n of the circumferential struts is determined by $n=D_a/X$, wherein X is in a value range of $20 \leq X \leq 80$, $D_a$ corresponds to the value in millimeters of a flow diameter (Ds) of the retaining device, and wherein n is rounded to an integer.

6. The retaining device according to claim 1, wherein an axial longitudinal extension (t) of the retaining device is constant in the area of the flow channels over a radial extension of the retaining device.

7. The retaining device according to claim 1, wherein central flow channels adjacent to a center axis (M) of the retaining device have a greater maximum flow cross-sectional area than flow channels located further outside in the radial direction.

8. The retaining device according to claim 1, wherein the circumferential struts form closed rings and divide the retaining device into multiple radially adjacent ring segments.

9. The retaining device according to claim 6, wherein the circumferential struts form closed rings and divide the retaining device into multiple radially adjacent ring segments, and wherein the mean axial longitudinal extension (t) of the retaining device is greater in the area of the flow channels than a mean circumferential length (L) of the flow channels in a radially outermost ring segment.

10. The retaining device according to claim 9, wherein a number of radial struts in radially outer ring segments is an integral multiple higher than in a radially innermost ring segment, which adjoins the central axis (M) of the retaining device.

11. The retaining device according to claim 8, wherein a ring segment cross-sectional area ($A_m$) of an inner ring segment increases toward a ring segment cross-sectional area ($A_{m-1}$) of a respective ring segment adjoining the inner ring segment radially outward, wherein $A_m = Y \cdot A_{m-1}$, with $1.1 \leq Y \leq 2.5$.

12. A unit comprising a retaining device according to claim 1, and an impeller anemometer attached to the retaining device, the unit for use in the fan.

13. A centrifugal fan with a fan housing having an outlet area, wherein the retaining device according to claim 1 is fixed to the outlet area of the fan housing and the anemometer is arranged on the retaining device directly adjoining retaining device in the axial flow direction, and the anemometer is attached to the retaining device via the retaining means.

14. The centrifugal fan according to claim 13, wherein the retaining device designed as a flow conditioner is arranged upstream of the anemometer as seen in the axial flow direction.

15. The centrifugal fan according to claim 13, wherein the anemometer is designed as a impeller anemometer with multiple impeller blades arranged such that they are spaced apart in the circumferential direction, wherein the impeller blades are curved in an arc shape in a circumferential direction opposite to the radial struts.

16. The retaining device according to claim 1, wherein a number n of the circumferential struts is determined by $n=D_a/X$, wherein X is in a value range of $35 \leq X \leq 60$, $D_a$ corresponds to the value in millimeters of a flow diameter (Ds) of the retaining device, and wherein n is rounded to an integer.

17. The retaining device according to claim 8, wherein a ring segment cross-sectional area ($A_m$) of an inner ring segment increases toward a ring segment cross-sectional area ($A_{m-1}$) of a respective ring segment adjoining the inner ring segment radially outward, wherein $A_m = Y \cdot A_{m-1}$, with $1.2 \leq Y \leq 2.0$.

18. An anemometer designed for use on a fan housing of a fan, the anemometer comprising an impeller having curved blades and a retaining device for mounting the anemometer to the fan housing, wherein the retaining device is designed as a flow conditioner to straighten a swirling flow of air from the fan, the retaining device having a plurality of axial flow channels divided into a honeycomb structure by an arrangement of bars including a plurality of radial struts extending radially and curved in a direction opposite a curvature of the curved blades of the impeller, and wherein the retaining device has a retainer configured for fastening the anemometer to the retaining device in a position axially adjoining the flow channels such that the flow conditioner is upstream of the impeller of the anemometer.

19. The retaining device according to claim 18, wherein the arrangement of bars includes a plurality of circumferential struts.

* * * * *